United States Patent [19]
Tabellini

[11] Patent Number: 5,967,692
[45] Date of Patent: Oct. 19, 1999

[54] DEVICE FOR FIXING A FLEXIBLE ELEMENT TO A ROLLER

[75] Inventor: Giorgio Tabellini, Bologna, Italy

[73] Assignee: P.E.I. Protezioni Elaborazioni Industriali S.r.l., di Rino (Bologna), Italy

[21] Appl. No.: 08/890,210

[22] Filed: Jul. 9, 1997

[30] Foreign Application Priority Data

Jul. 23, 1996 [EP] European Pat. Off. ............. 96830406

[51] Int. Cl.$^6$ .................................................. B25G 3/08
[52] U.S. Cl. ..................... 403/381; 403/331; 29/895.21; 160/238; 160/DIG. 15; 492/48; 492/36
[58] Field of Search .................................. 403/381, 331, 403/217, 218; 160/DIG. 15, 238, 394; 29/895.2, 895.21, 895.23; 492/48, 36

[56] References Cited

U.S. PATENT DOCUMENTS

| | | |
|---|---|---|
| 1,333,906 | 3/1920 | De Villers . |
| 1,492,736 | 5/1924 | Metzger ........................ 160/DIG. 15 |
| 2,022,807 | 12/1935 | Hagerty . |
| 2,361,785 | 10/1944 | Mohun ................................ 160/238 |

*Primary Examiner*—Lynne Reichard
*Assistant Examiner*—David E. Bochna
*Attorney, Agent, or Firm*—Nicholas A. Kees; Godfrey & Kahn, S.C.

[57] ABSTRACT

A device for fixing a flexible element to the tubular body of a roller for rolling shutters, guards or blinds, wherein the tubular body has a slot made in its lateral surface and accessible from the outside through a first and a second opening the first oriented at right angles to the axial direction, the second at right angles to the tangential direction, of the tubular body; the radial measurement of the first opening relative to the tubular body is larger than the corresponding measurement of the second opening; the flexible element has at one end of it an enlarged fixing head especially shaped to allow it to be inserted into the slot through the first opening and through the second opening, remaining trapped inside the slot when the flexible element moves through the second opening.

10 Claims, 1 Drawing Sheet

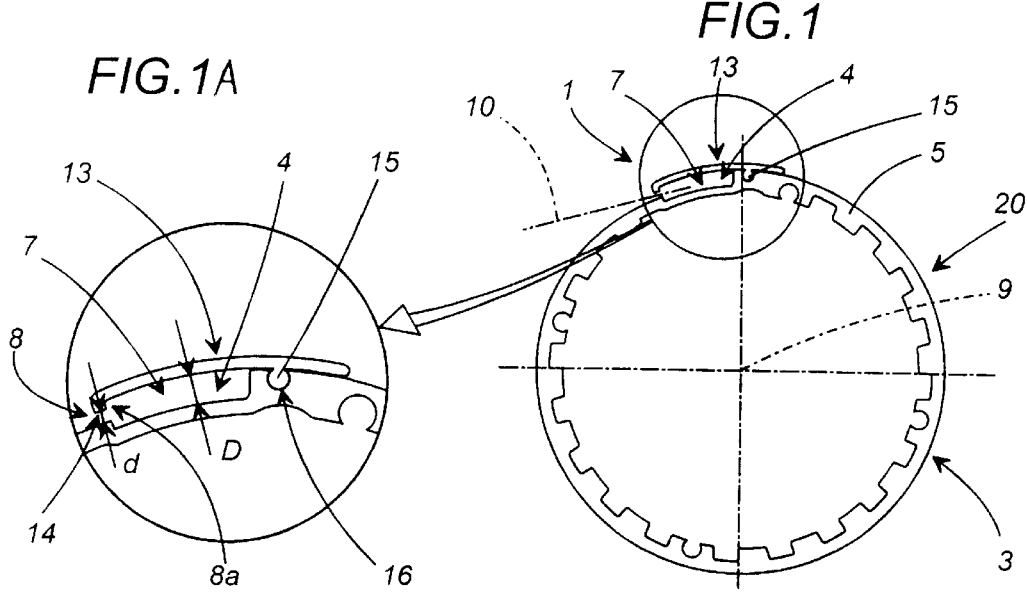
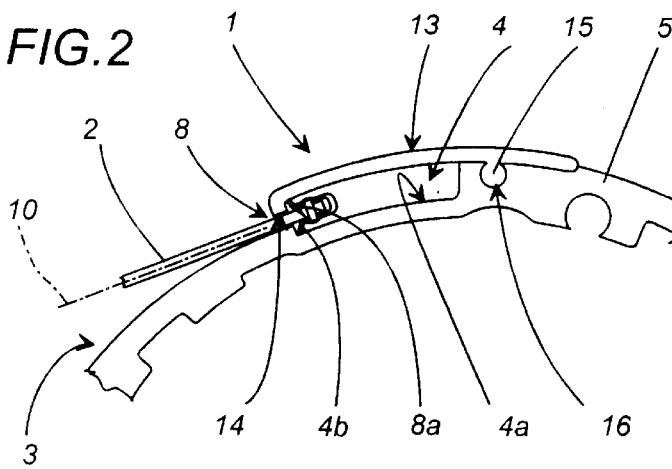
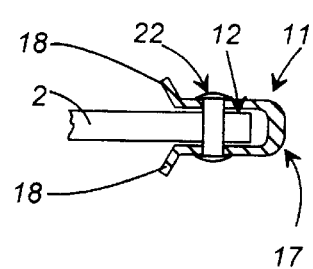
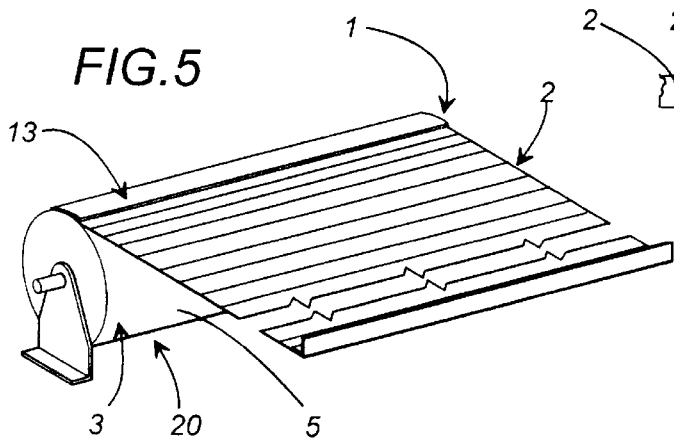
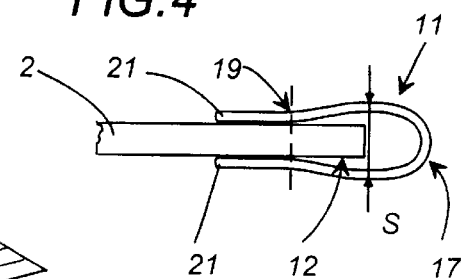

DEVICE FOR FIXING A FLEXIBLE ELEMENT TO A ROLLER

BACKGROUND OF THE INVENTION

The present invention relates to a device for fixing a flexible element to a roller.

The invention applies in particular, but without thereby restricting the scope of the disclosure, to the field of industrial protections, to the manufacture of rolling screens or guards (for example, those used to isolate machine tools) or to protect and guard certain machine parts such as slideways. Protections of this kind have flexible elements which roll up onto rollers and which can be unrolled to prevent machine parts not only from knocking against extraneous objects or coming into contact with shavings or swarf but also from being dirtied by contact with acids or pollutants in general. Similar protection devices may also be used as movable covers, strong enough to be walked on, if necessary, placed over the installation pits of large machines or as rolling covers for tanks.

The abovementioned rollers have a tubular body which revolves about its axis so as to roll or unroll the flexible element connected with it by overcoming the force exerted by one or more helical springs located inside the roller itself.

Several methods have been used up to the present time to attach the flexible element to the tubular body. According to one of these methods, one end of the flexible element is glued to the tubular body by a layer of suitable adhesive.

Although this solution has the advantage of allowing plain tubing, freely available on the market, to be used to make the roller and of dispensing with the need for mechanical parts inside and outside the tubular body, it has numerous disadvantages, the most important of which may be ascribed to the following factors:

- the unavailability of non-toxic adhesives suitable for applications such as those mentioned above;
- the hazards created by the solvents used;
- the difficulty of creating a strong adhesive bond between materials of a very different nature such as, for example, plastics and aluminium alloys or aluminium alloys and stainless steels;
- the poor resistance of ordinary adhesives to chemicals which may come into contact with them during use;
- the poor resistance of ordinary adhesives to high and low temperatures;
- the difficulty of procuring adhesives with specific properties for applications such as those mentioned above;
- the impossibility of gluing "non-stick" materials such as polytetrafluoroethylene;
- the difficulty of knowing exactly where a guard or protection will be installed so as to be able to choose beforehand the adhesive most suitable for the ambient conditions.

Alternatively, the flexible element may be attached to the tubular body using screws, rivets and similar means.

This solution, although it eliminates many of the drawbacks of adhesives listed above, has the disadvantage not only of increasing production costs but also of creating the need for parts inside and outside the tubular body, with sharp points or edges protruding from the inside surface of the tube that may damage the spring mechanisms inside.

In yet another method of attaching the flexible element to the tubular body, the end of the flexible element is wound round and fixed to a metal rod which fits into grooves made in the outer surface of the tube.

The main disadvantage of this solution is that it may be applied only to very thin, flexible panels which, as such, can satisfy the requirements of a very limited number of applications.

Moreover, in addition to requiring tubes that are especially shaped for each specific application, this solution has the further disadvantage that the parts inside the tubular body occupy an excessive amount of space.

The aim of the present invention is to eliminate the drawbacks of all the methods listed above with a device for fixing the flexible element to the tubular body of the roller that can satisfy the requirements of a wide range of applications, particularly as regards the possible combinations of shapes, sizes and materials of the flexible element and of the tubular body.

SUMMARY OF THE INVENTION

These and other aims are achieved by a device for fixing a flexible element to a roller with a tubular body characterized in that the tubular body has a longitudinal slot in its lateral surface accessible from the outside through a first opening and a second opening, the first opening being oriented substantially at right angles to the axial direction of the tubular body, and the second opening being oriented substantially at right angles to the tangential direction of the tubular body; the radial measurement of the first opening relative to the tubular body being larger than the corresponding measurement of the second opening and the said flexible element having at one end of it an enlarged fixing head especially shaped to securely engage and become trapped in an area inside the slot when the flexible element moves through the second opening.

BRIEF DESCRIPTION OF THE DRAWINGS

The invention will now be described with reference to the accompanying drawings which illustrate a preferred embodiment of it and in which:

FIG. 1 is an axial view of a tubular body of a roller made in accordance with the present invention illustrated, for clarity, without the flexible element;

FIG. 2 is an enlarged view of a part of the tubular body illustrated in FIG. 1;

FIGS. 3 and 4 are side views of the end of a flexible element used with the tubular body illustrated in FIG. 1;

FIG. 5 is a schematic perspective view of a roller equipped with the device disclosed by the present invention.

DESCRIPTION OF THE PREFERRED EMBODIMENTS

With reference to the accompanying drawings, the numeral 1 indicates a device for fixing a flexible element 2 to a tubular body 3 designed especially to be used as a roller 20, for rolling shutters, guards or blinds, which is illustrated as a whole in FIG. 5, and which forms the subject-matter of a separate patent application filed at the same time by the same Applicant as the present.

With reference to FIGS. 1 and 2, the body 3 consists of a substantially cylindrical tube, with a slot 4 made in its lateral surface 5 and accessible from the outside through a first opening 7 and a second opening 8. The first opening 7 is oriented at right angles to the axial direction 9 of the tubular body 3, whilst the second opening 8 is oriented substantially at right angles to the tangential direction 10 of the tubular body 3.

The measurement D of the first opening 7 radial to the tubular body 3 is larger than the corresponding measurement, labelled d, of the second opening 8.

The flexible element 2 (see FIGS. 3 and 4 in particular) has at one end of it 12 an enlarged fixing head 11 especially shaped to allow it to be inserted into the slot 4 through the first opening 7, according to a movement in the axial direction 9, and to be trapped inside the slot according to the tangential direction 10 as the flexible element 2 crosses the second opening 8. The fixing head 11 may be inserted into the slot 4 by making it pass through the second opening 8. Once it has moved past the opening 8, the head 11 engages with and is trapped by an area 8a inside the slot 4, again as the flexible element 2 crosses the opening 8.

The device 1 includes a wall element 13 with a transverse protrusion 14 extending radially at a distance from the lateral surface 5 of the tubular body 3. The wall element 13 is slotted into the lateral surface 5 of the tubular body 3 and its protrusion 14 projects radially to the tubular body 3 towards the lateral surface 5 in such a way as to define the slot 4, together with the lateral surface 5 itself.

The slot 4 (FIG. 2) has a locally recessed bottom 4a on the lateral surface 5 of the tubular body 3. The recessed bottom 4a, in combination with the remaining portion of lateral surface 5, defines an inside corner 4b located under the protrusion 14 of the wall element 13 which together form the part that stops the head 11 of the flexible element 2 against the tangential forces which tend to pull the flexible element 2 out of the slot 4, as will be clarified below.

The means for joining the wall element 13 to the lateral surface 5 are shown in FIG. 2 and consist of a rib 15, made on the wall element 13, and a groove 16, made in the lateral surface 5 of the tubular body 3. The rib 15 and the groove 16 are especially shaped to allow the former to slide freely into the latter from the side in the axial direction 9 but to stay together firmly in the radial direction to the tubular body 3. As regards the head 11, FIG. 4 shows the preferred embodiment for thin flexible elements 2 made of fabric, for example, from natural fibres or synthetic plastic fibres, such as "kevlar". In this embodiment, the head 11 is made by connecting to the end 12 of the flexible element 2 a piece 17 of flexible element, made for example of the same material as the flexible element 2, folded into a U round the end 12 of the flexible element 2 itself and attached to the latter by means of stitching 19. The thickness S of the piece 17, measured radially to the tubular body 3, is almost equal to the larger measurement D of the first opening 7 of the slot 4. In addition, the stitching 19 creates two free strips 21 designed to stop against the inside surface 8a of the slot 4.

FIG. 3 shows another embodiment of the fixing head 11, used preferably for thick flexible elements 2 such as rolling shutters consisting of rigid steel panels flexibly joined to each other.

FIG. 3 shows in particular that the piece 17 is made of a metal material, is attached to the flexible element 2 by means of rivets 22 and has rigid splayed fins 18 which, once inserted into the slot 4 from the side, engage the protrusion 14 and the inside corner 4b in such a way as to prevent the flexible element 2 from being pulled out of the slot 4 in the tangential direction 10.

In both the embodiments illustrated, the thickness S of the head 11, during use, tends to increase directly proportionally to the intensity of the pulling force exerted on the flexible element 2.

The accompanying drawings illustrate two embodiments of the heads 11 for two specific applications. Although it is evident that, in practice, the rollers may be made for a very wide range of applications, depending on the material used, the size of the flexible element and the method adopted to fix the piece 17, the fixing device 1 disclosed by the present invention may be used for all applications since it makes the tubular body 3 completely independent of the materials and of the physical and chemical properties of the flexible element 2, which must instead be taken into account only for the manufacture of the head 11.

In other terms, the advantages of the invention are its modularity, its suitability for all applications, and the low cost of making the joints.

The invention described can be subject to modifications and variations without thereby departing from the scope of the inventive concept. Moreover, all the details of the invention may be substituted by technically equivalent elements. For example, in the embodiment where the piece 17 is made of metal, it may be attached to the end 12 of the flexible element 2 by means of spot welding.

What is claimed:

1. In combination, a device for fixing a flexible element to a roller, together with the flexible element and the roller, comprising:

a tubular body having a longitudinal slot in its lateral surface along the entire length of the roller, and a wall element partially covering the longitudinal slot, wherein the slot is accessible from the outside through a first opening and a second opening, the first opening being oriented substantially at right angles to the axial direction of the tubular body, and the second opening being oriented at right angles to the tangential direction of the tubular body, with a measurement of the first opening radial to the tubular body being larger than a corresponding measurement of the second opening;

the flexible element having at one end an enlarged fixing head shaped in such a way as to securely engage and become trapped in an area inside the slot when the flexible element moves through the second opening;

the wall element is connected to the lateral surface of the tubular body and set at a distance from the lateral surface in such a way that, together with the lateral surface, the wall element defines the slot, the wall element having a protrusion that projects radially towards the lateral surface of the tubular body in such a way as to define the second opening of the slot; and the slot has a recessed bottom on the lateral surface of the tubular body defining an inside corner against which the fixing head of the flexible element is stopped and which is located under the protrusion.

2. In combination, a device for fixing a flexible element to a roller, together with the flexible element and the roller, comprising:

a tubular body having a longitudinal slot in its lateral surface along the entire length of the roller, and a wall element partially covering the longitudinal slot, wherein the slot is accessible from the outside through a first opening and a second opening, the first opening being oriented substantially at right angles to the axial direction of the tubular body, and the second opening being oriented at right angles to the tangential direction of the tubular body, with a measurement of the first opening radial to the tubular body being larger than a corresponding measurement of the second opening;

the flexible element having at one end an enlarged fixing head shaped in such a way as to securely engage and become trapped in an area inside the slot when the flexible element moves through the second opening;

the end fixing head includes a piece of flexible element folded into a U-shaped portion around the end of the flexible element, the thickness of the U-shaped portion of the piece being almost equal to the larger measurement of the first opening of the slot; and the flexible piece is attached to the end of the flexible element by means of stitching which defines two free strips which stop against the inside surface of the slot.

3. In combination, a device for fixing a flexible element to a roller, together with the flexible element and the roller, the combination comprising:

a tubular body having a longitudinal slot in its lateral surface along the entire length of the roller, and a wall element partially covering the longitudinal slot, wherein the slot is accessible from the outside through a first opening and a second opening, the first opening being oriented substantially at right angles to the axial direction of the tubular body, and the second opening being oriented at right angles to the tangential direction of the tubular body, with a measurement of the first opening radial to the tubular body being larger than a corresponding measurement of the second opening;

the flexible element having at one end an enlarged fixing head shaped in such a way as to securely engage and become trapped in an area inside the slot when the flexible element moves through the second opening;

the end fixing head includes a piece of flexible element folded into a U-shaped portion around the end of the flexible element, the thickness of the U-shaped portion of the piece being almost equal to the larger measurement of the first opening of the slot; and the piece has rigid splayed fins which interact with the slot, engaging at least the protrusion so as to prevent the flexible element from being pulled out of the slot in the tangential direction.

4. The device according to claim 3 wherein the said piece is attached to the flexible element by means of rivets.

5. The device according to claim 3 wherein the said piece is attached to the flexible element by spot welding.

6. The combination of a device for fixing a flexible element to a roller, the flexible element itself and the roller, comprising:

a tubular body having a longitudinal slot in its lateral surface along the entire length of the roller, and a wall element partially covering the longitudinal slot, wherein the slot is accessible from the outside through a first opening and a second opening, the first opening being oriented substantially at right angles to the axial direction of the tubular body, and the second opening being oriented at right angles to the tangential direction of the tubular body, with a measurement of the first opening radial to the tubular body being larger than a corresponding measurement of the second opening;

the flexible element having at one end an enlarged fixing head shaped in such a way as to securely engage and become trapped in an area inside the slot when the flexible element moves through the second opening;

the end fixing head includes a piece of flexible element folded into a U-shaped portion around the end of the flexible element, the thickness of the U-shaped portion of the piece being almost equal to the larger measurement of the first opening of the slot; and the piece is made of a metal material.

7. A device for fixing a flexible element to a roller in industrial protection comprising:

a tubular body having a cylindrical wall including an external lateral surface and an internal lateral surface;

the tubular body having an axial direction and a tangential direction;

the tubular body having a first longitudinal cavity formed in the cylindrical wall on the external lateral surface, accessible from the outside through a first opening and a second opening;

the tubular body having a second internal cavity, substantially cylindrical and bounded by the internal lateral surface, for receiving means for unwinding and rewinding the flexible element;

said first longitudinal cavity being shaped and disposed in the cylindrical wall in such a way that the internal lateral surface is substantially cylindrical and unaffected by said first longitudinal cavity;

the first opening being oriented substantially at right angles to the axial direction of the tubular body;

the second opening being oriented at right angles to the tangential direction of the tubular body, a predetermined measurement of the first opening radial to the tubular body being larger than a corresponding measurement of the second opening;

the second opening has a recessed bottom on the lateral surface of the tubular body defining an inside corner against which the fixing head of the flexible element is stopped;

said flexible element having at one end an enlarged fixing head shaped in such a way as to securely engage and become trapped in an area inside said first opening when the flexible element moves through the second opening;

the fixing head includes a piece of flexible element folded into a U-shaped portion around the end of the flexible element, the thickness of the U-shaped portion being almost equal to the predetermined measurement of the first opening; and the U-shaped portion is attached to the end of the flexible element by means of stitching which defines two free strips which stop against the inside surface of the first opening.

8. A device for fixing a flexible element to a roller in industrial protection comprising:

a tubular body having a cylindrical wall including an external lateral surface and an internal lateral surface;

the tubular body having an axial direction and a tangential direction;

the tubular body having a first longitudinal cavity formed in the cylindrical wall on the external lateral surface, accessible from the outside through a first opening and a second opening;

the tubular body having a second internal cavity, substantially cylindrical and bounded by the internal lateral surface, for receiving means for unwinding and rewinding the flexible element;

said first longitudinal cavity being shaped and disposed in the cylindrical wall in such a way that the internal lateral surface is substantially cylindrical and unaffected by said first longitudinal cavity;

the first opening being oriented substantially at right angles to the axial direction of the tubular body;

the second opening being oriented at right angles to the tangential direction of the tubular body, a predetermined measurement of the first opening radial to the tubular body being larger than a corresponding measurement of the second opening;

the second opening has a recessed bottom on the lateral surface of the tubular body defining an inside corner against which the fixing head of the flexible element is stopped;

said flexible element having at one end an enlarged fixing head shaped in such a way as to securely engage and become trapped in an area inside said first opening when the flexible element moves through the second opening;

the fixing head includes a piece of flexible element folded into a U-shaped portion around the end of the flexible element, the thickness of the U-shaped portion being almost equal to the predetermined measurement of the first opening; and the U-shaped portion has rigid splayed fins which interact with the second opening so as to prevent the flexible element from being pulled out of the second opening in the tangential direction.

9. A device for fixing a flexible element to a roller in industrial protection comprising:

a tubular body having a cylindrical wall including an external lateral surface and an internal lateral surface;

the tubular body having an axial direction and a tangential direction;

the tubular body having a first longitudinal cavity formed in the cylindrical wall on the external lateral surface, accessible from the outside through a first opening and a second opening;

the tubular body having a second internal cavity, substantially cylindrical and bounded by the internal lateral surface, for receiving means for unwinding and rewinding the flexible element;

said first longitudinal cavity being shaped and disposed in the cylindrical wall in such a way that the internal lateral surface is substantially cylindrical and unaffected by said first longitudinal cavity;

the first opening being oriented substantially at right angles to the axial direction of the tubular body;

the second opening being oriented at right angles to the tangential direction of the tubular body, a predetermined measurement of the first opening radial to the tubular body being larger than a corresponding measurement of the second opening;

the second opening has a recessed bottom on the lateral surface of the tubular body defining an inside corner against which the fixing head of the flexible element is stopped;

said flexible element having at one end an enlarged fixing head shaped in such a way as to securely engage and become trapped in an area inside said first opening when the flexible element moves through the second opening;

the fixing head includes a piece of flexible element folded into a U-shaped portion around the end of the flexible element, the thickness of the U-shaped portion being almost equal to the predetermined measurement of the first opening; and the U-shaped portion is made of a metal material, riveted onto the end of the flexible element.

10. A device for fixing a flexible element to a roller in industrial protection comprising:

a tubular body having a cylindrical wall including an external lateral surface and an internal lateral surface;

the tubular body having an axial direction and a tangential direction;

the tubular body having a first longitudinal cavity formed in the cylindrical wall on the external lateral surface, accessible from the outside through a first opening and a second opening;

the tubular body having a second internal cavity, substantially cylindrical and bounded by the internal lateral surface, for receiving means for unwinding and rewinding the flexible element;

said first longitudinal cavity being shaped and disposed in the cylindrical wall in such a way that the internal lateral surface is substantially cylindrical and unaffected by said first longitudinal cavity;

the first opening being oriented substantially at right angles to the axial direction of the tubular body;

the second opening being oriented at right angles to the tangential direction of the tubular body, a predetermined measurement of the first opening radial to the tubular body being larger than a corresponding measurement of the second opening;

the second opening has a recessed bottom on the lateral surface of the tubular body defining an inside corner against which the fixing head of the flexible element is stopped;

said flexible element having at one end an enlarged fixing head shaped in such a way as to securely engage and become trapped in an area inside said first opening when the flexible element moves through the second opening;

the fixing head includes a piece of flexible element folded into a U-shaped portion around the end of the flexible element, the thickness of the U-shaped portion being almost equal to the predetermined measurement of the first opening; and wherein the U-shaped portion is made of a metal material, spot welded onto the end of the flexible element.

* * * * *